United States Patent
Guri et al.

(10) Patent No.: US 10,817,605 B2
(45) Date of Patent: *Oct. 27, 2020

(54) SYSTEM AND METHOD FOR DETECTING ACTIVITIES WITHIN A COMPUTERIZED DEVICE BASED ON MONITORING OF ITS POWER CONSUMPTION

(71) Applicant: B.G. NEGEV TECHNOLOGIES AND APPLICATIONS LTD., AT BEN-GURION UNIVERSITY, Beer Sheva (IL)

(72) Inventors: Mordechai Guri, Modi'in (IL); Yuval Elovici, Lachish (IL)

(73) Assignee: B.G. NEGEV TECHNOLOGIES AND APPLICATIONS LTD., AT BEN-GURION UNIVERSITY, Beer Sheva (IL)

(*) Notice: Subject to any disclaimer, the term of this patent is extended or adjusted under 35 U.S.C. 154(b) by 210 days.

This patent is subject to a terminal disclaimer.

(21) Appl. No.: 15/128,352

(22) PCT Filed: Mar. 22, 2015

(86) PCT No.: PCT/IL2015/050297
§ 371 (c)(1),
(2) Date: Sep. 22, 2016

(87) PCT Pub. No.: WO2015/145425
PCT Pub. Date: Oct. 1, 2015

(65) Prior Publication Data
US 2018/0173877 A1 Jun. 21, 2018

Related U.S. Application Data

(60) Provisional application No. 61/969,179, filed on Mar. 23, 2014.

(51) Int. Cl.
*G06F 21/56* (2013.01)
*G06F 1/28* (2006.01)
(Continued)

(52) U.S. Cl.
CPC .............. *G06F 21/566* (2013.01); *G06F 1/28* (2013.01); *G06F 21/552* (2013.01); *G06F 21/81* (2013.01)

(58) Field of Classification Search
CPC ...... G06F 21/566; G06F 21/552; G06F 21/81; G06F 1/28
See application file for complete search history.

(56) References Cited

U.S. PATENT DOCUMENTS 7,184,905 B2 * 2/2007 Stefan ................ G01R 19/2513
320/116
8,332,945 B2 12/2012 Kim et al.
(Continued)

FOREIGN PATENT DOCUMENTS

| EP | 2260563 B1 | 10/2011 |
| WO | WO-2009/109787 A1 | 9/2009 |
| WO | 2012087685 A1 | 6/2012 |

OTHER PUBLICATIONS

International Search Report and Written Opinion in International Application No. PCT/IL2015/050297, dated Mar. 22, 2015.
(Continued)

*Primary Examiner* — Lynn D Feild
*Assistant Examiner* — Abdullah Almamun
(74) *Attorney, Agent, or Firm* — Venable LLP; Jeffri A. Kaminski

(57) ABSTRACT

The invention relates to a system for protecting a computerized device from a malicious activity resulting from a malicious code, which comprises: (a) a first DC supply monitoring unit which is located within a separate comput-
(Continued)

erized environment, namely an environment which is totally separated and isolated both physically and in terms of connectivity from the hardware and software of the computerized environment of the device; (b) a memory database for storing one or more signatures of known malicious events, each of said signatures describes the temporal effect of a malicious event, respectively, on the power consumption from the DC supply of the device; and (c) a microprocessor within said DC supply monitoring unit for continuously monitoring the power consumption from said DC supply of the device, comparing temporal characteristics of the power consumption with said malicious events signatures in said database, and alerting upon detection of a match, wherein said DC supply monitoring unit is at most physically connected to the DC supply of the device.

14 Claims, 4 Drawing Sheets

(51) Int. Cl.
*G06F 21/81* (2013.01)
*G06F 21/55* (2013.01)

(56) References Cited

U.S. PATENT DOCUMENTS

| 9,297,841 | B2* | 3/2016 | Chun | G06Q 10/00 |
| 9,298,909 | B2* | 3/2016 | Du | G06F 21/81 |
| 2007/0182421 | A1 | 8/2007 | Janke et al. | |
| 2008/0276111 | A1* | 11/2008 | Jacoby | G06F 21/55 |
| | | | | 713/340 |
| 2010/0313270 | A1* | 12/2010 | Kim | G06F 1/28 |
| | | | | 726/24 |
| 2012/0158201 | A1* | 6/2012 | Leeds | G08B 13/1418 |
| | | | | 700/293 |
| 2012/0180126 | A1 | 7/2012 | Liu et al. | |
| 2015/0121524 | A1* | 4/2015 | Fawaz | G06F 21/566 |
| | | | | 726/23 |

OTHER PUBLICATIONS

European Office Action in corresponding European Appplication No. 15 202 922.9 dated Sep. 20, 2019 (5 pages).

* cited by examiner

FIG. 1 – PRIOR ART

SYSTEM AND METHOD FOR DETECTING ACTIVITIES WITHIN A COMPUTERIZED DEVICE BASED ON MONITORING OF ITS POWER CONSUMPTION

FIELD OF INVENTION

The field of the invention relates in general to methods and systems for securing computerized environments and devices. More specifically, the invention relates to a method and system for securing a computerized device by means of monitoring of its electrical power consumption.

BACKGROUND OF THE INVENTION

Computerized devices, either stationary or mobile, are valuable targets for skillful, sophisticated, and motivated offenders. Many protection techniques have been developed to protect computerized devices from malicious code. In this respect, the fast development of smart phones and tablets has exposed the users to still additional aspects of security issues compared to stationary devices. While intrusions into stationary devices generally provide data per se, smartphones include many built in sensors that can be turned on silently by a malicious code, thereby exposing valuable data and private information to the attacker.

Modern smartphones host various gadgets and sensors, such as GPS, Wi-Fi, voice, camera, accelerometers, etc. The normal activation of such components (gadgets and sensors) normally requires manual input from the user, typically by touching the screen. However, an unauthorized intrusion which introduces a malicious code may activate one or more of said sensitive component without the user's consent. This serious vulnerability is exploited by remote hostile agents to gather sensitive information through the subverted mobile phone. For this purpose, and in similarity to stationary devices, a variety of security software has been developed and is widely used for protecting mobile devices. In this respect, it should be noted that the security model of most mobile phone operating systems discourages some typical monitoring solutions that are available for personal computers and stationary devices.

One alternative solution for protecting a mobile phone from a malicious code is disclosed, for example, by Zefferer et. al. Zefferer proves that a malware running within the mobile phone has a unique characteristic "signature" (although he does not specifically uses the term "signature"), therefore various malwares can be detected by means of monitoring the power consumption from the battery. More specifically, Zefferer suggests monitoring of the power consumption by means of dedicated software to detect anomalies that may hint to the presence of malicious code. This solution is based on said assumption that a variety of malicious activities within the protected environment have characteristic and detectable behaviors, respectively, in terms of power consumption. More specifically, malicious activities have their own "signature". This solution in fact suggests performing a continuous monitoring of the power consumption by means of dedicated software, and detection of such "signatures". In some additional cases, and in a manner common in the field of computer security, this detection technique may be used in association with other protection techniques. However, according to all of the prior art publications, said monitoring of the device's power consumption, is performed by a program that runs within the same computerized environment that it intends to protect.

The term "environment", or "computerized environment" relates herein to a range of hardware and software, that are in turn accessible either physically (for example, via a USB connector) or wirelessly (for example, via a WiFi network). Typically an "environment" is a close computerized range to which access is allowed only to authorized persons or programs, however, a "closed" environment may be breached by unauthorized activities, either via said physical connection or wirelessly.

As noted, a variety of software tools have been developed to protect a computerized environment (i.e., either stationary computers or mobile devices), from malicious programs and activities. All of security software tools, no matter what measures they apply, have one characteristic in common: They all run a protection code on the device (stationary or mobile) or network of devices that they intend to protect, i.e., they run within the same environment that they intend to protect. For example, the anti-virus tool executes a program that runs within the device to scan the one or more hard discs and the device memory. The firewall, in turn, runs a program within the internal computerized environment that masks the structure of the environment from the world outside of this environment.

This manner of operation, however, has a significant drawback. The fact that a malicious code has successfully injected to within the protected environment is in itself a proof for the vulnerability of this environment. As a result of this vulnerability, and by the same manner that the malicious code was successfully injected to within the protected environment, a same or another code may, for example, manipulate the protecting code (for example, anti-virus, or any other protecting software) to perform one of the following: (i) to stop operation; (ii) to ignore the existence of the malicious code within the protected environment; or (iii) to manipulate the code such that no report will be issued to the user with respect to the detection of the malicious code. Following this manipulation, the malicious code in fact can operate freely within the protected environment.

It is therefore an object of the present invention to provide a protecting code which is fully isolated and protected from any external manipulation.

It is a more specific object of the invention to provide said protecting code which detects and alerts of unauthorized events, by monitoring the power consumption of the device.

It is still another object of the invention to provide a method and system which can be applied to both stationary devices that are fed from a power supply and to mobile devices that are fed from a battery.

Other objects and advantages of the invention will become apparent as the description proceeds.

SUMMARY OF THE INVENTION

The invention relates to a system for protecting a computerized device from a malicious activity resulting from a malicious code, which comprises: (a) a first DC supply monitoring unit which is located within a separate computerized environment, namely an environment which is totally separated and isolated both physically and in terms of connectivity from the hardware and software of the computerized environment of the device; (b) a memory database for storing one or more signatures of known malicious events, each of said signatures describes the temporal effect of a malicious event, respectively, on the power consumption from the DC supply of the device; and (c) a microprocessor within said DC supply monitoring unit for continuously monitoring the power consumption from said DC supply of the device, comparing temporal characteristics of the power consumption with said malicious events signatures in said database, and alerting upon detection of a match, wherein said DC supply monitoring unit is at most physically connected to the DC supply of the device.

Preferably, said first DC supply monitoring unit is positioned on a separate printed circuit, and wherein said microprocessor bases its monitoring on sampling of the current consumption from said DC supply.

Preferably, said computerized device is a mobile device, and wherein said DC supply is the battery of the device.

Preferably, said computerized device is a stationary device, and wherein said DC supply is the power supply of the device.

Preferably, said malicious events are combined from the occurrence of one or more of individual incidents.

Preferably, said alerting is provided by visual, audible, or a combination thereof of alert means that are positioned within said separated and isolated first DC supply monitoring unit.

said visual means is a light emitting diode, and said visual means is a buzzer. Preferably, the form and manner of the alert may be selected from several levels of alerts.

Preferably, the monitoring of the power consumption from the DC supply is performed by means of sampling of current consumption.

Preferably, said first DC supply monitoring unit is positioned on a separate printed board, and wherein said separate printed board having a port for communicating input and output data to and from the first DC supply monitoring unit.

Preferably, said port is used to update said database of one or more signatures.

Preferably, said memory also stores a first events log.

Preferably, the system further comprises: (a) a second DC supply monitoring program which runs within said computerized environment of the device simultaneously with said monitoring microprocessor that runs within said separate environment, and which forms a second events log; and (b) an external entity which extracts said first events log from the separate computerized environment and said second events log from the computerized environment of the device, and which compares said two logs to possibly detect mismatch of detected events, that hints to a malicious manipulation of said second DC supply monitoring unit.

DETAILED DESCRIPTION OF PREFERRED EMBODIMENTS OF THE INVENTION

As noted above, all the security software that intends to protect a computerized environment from a malicious code runs some software from within the protected environment itself. This is also the case with Zefferer et. al (mentioned above) which suggests detection of malicious code by means of monitoring the power consumption of the mobile device by means of dedicated software. As also noted, this approach, i.e., the running of a security program from within the protected environment, has an inherent drawback, as the malicious code which has been successfully injected into the system may manipulate the security program itself, to either: (i) stop its operation; (ii) cause it to ignore the existence of the malicious code within the protected environment; or (iii) manipulate the security program such that no report will be issued to the user with respect to the detection of the malicious code.

Figure 1:
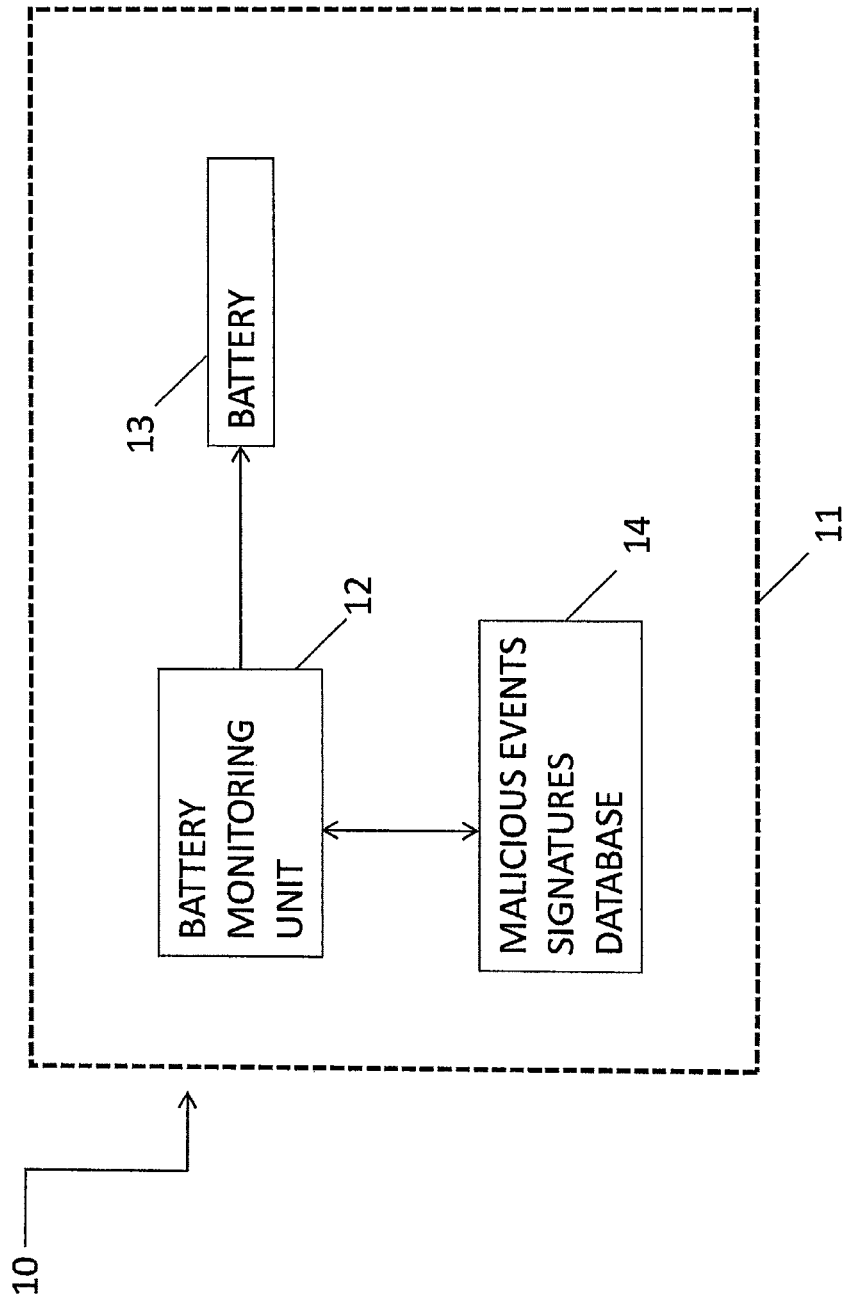
FIG. 1 illustrates in a simplified block diagram form a prior art security system for determining events based on power consumption.

FIG. 1 illustrates in a simplified block diagram form the manner by which the prior art security system 10, such as a hypothetical system based on Zefferer operates. The protecting system 10 based on Zefferer typically operates by means of a running application to protect a computerized environment of 11 of a mobile device. Naturally, the running application operates from within the protected environment 11, i.e., by means of the microprocessor of the mobile device and from the same memory on which the operating system and all the other programs and applications run on the device. Therefore, and as noted above, this protecting system 10, having the form of a program, is susceptible to malicious manipulations. The system 10 comprises a software-based battery monitoring unit 12 which monitors the power consumption from battery 13 to detect battery consumption events. A battery consumption event may be considered as any change with respect to the power consumption from the battery 13. Upon detection of any of such event, the battery monitoring unit records the event characteristics, and compares these characteristics against each of the malicious code signatures that are stored within the malicious code signatures database 14. Upon finding of any match between the recorded event and a signature within the database, the monitoring unit issues an alert.

Figure 2:
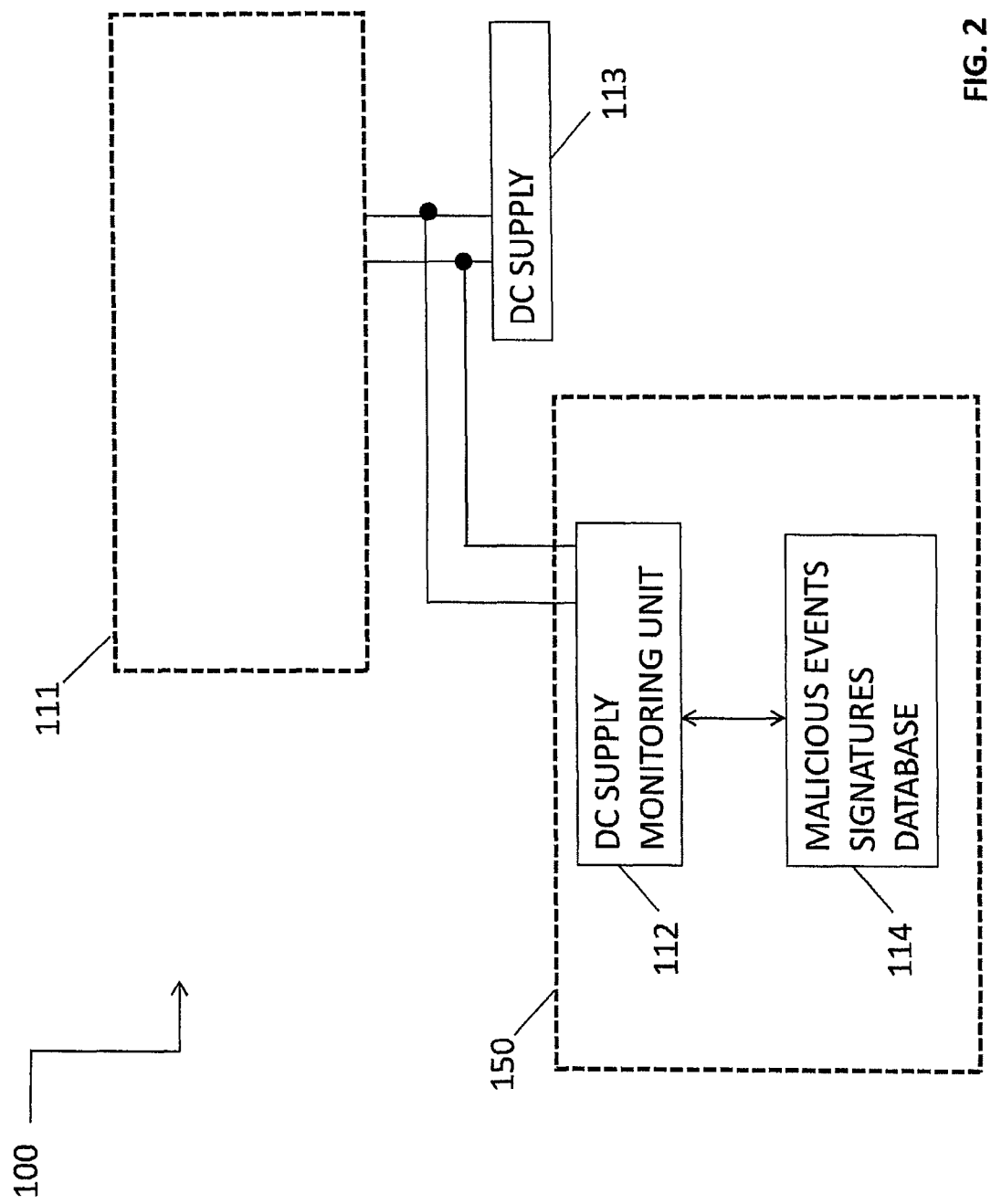
FIG. 2 shows in a simplified block diagram form a protecting system for protecting a computerized device (either mobile device or a stationary device), according to an embodiment of the present invention.

FIG. 2 shows in a simplified block diagram form a protecting system 100 for protecting a computerized device (either mobile device or a stationary device), according to an embodiment of the present invention. The environment 111 is the conventional computerized environment (hardware and software) of the device. The DC supply 113 may be either a battery of the mobile device or a DC power supply of a stationary device and it feeds, as is conventional, DC voltage to the hardware portion of the environment 111. The DC supply monitoring unit 112 and the malicious events signatures database 114 are similar in their nature to the battery monitoring unit 12 and malicious events signatures 14 of FIG. 1, respectively, however they operate on a computerized environment 150 which is totally isolated from the computerized environment 111 of the device. More specifically, the battery monitoring unit 112 and the malicious events signatures database 114 are operated by a separate microprocessor (not shown) which is positioned on an individual printed circuit which is totally separated and isolated both physically and in terms of connectivity from both the hardware and software of the computerized environment 111 of the device. The DC supply 113 is shown external of the computerized environments 111 and 150, as the battery only feeds in parallel these two environments with DC voltage. However, there is no way whatsoever for interaction between these two environments 111 and 150, as they are totally separated and isolated one from the other both in terms of hardware physical separation and in terms of software separation.

According to the present invention, the DC supply monitoring unit 112 which is totally separated and isolated from the computerized environment of the device also comprises alert means (not shown). Upon detection of a malicious event, the alert may be provided to the user, visually, audibly or both. The visual alert may be provided to the user, for example, by means of a light emitting diode, and the audible alert may be provided by means of a buzzer. In any case, all the means for providing said alerts are located on the printed circuit which is totally separated and isolated from the computerized environment of the device. Furthermore, several levels of alert may be provided, and these levels may be reflected either visually of audibly.

Figure 3:
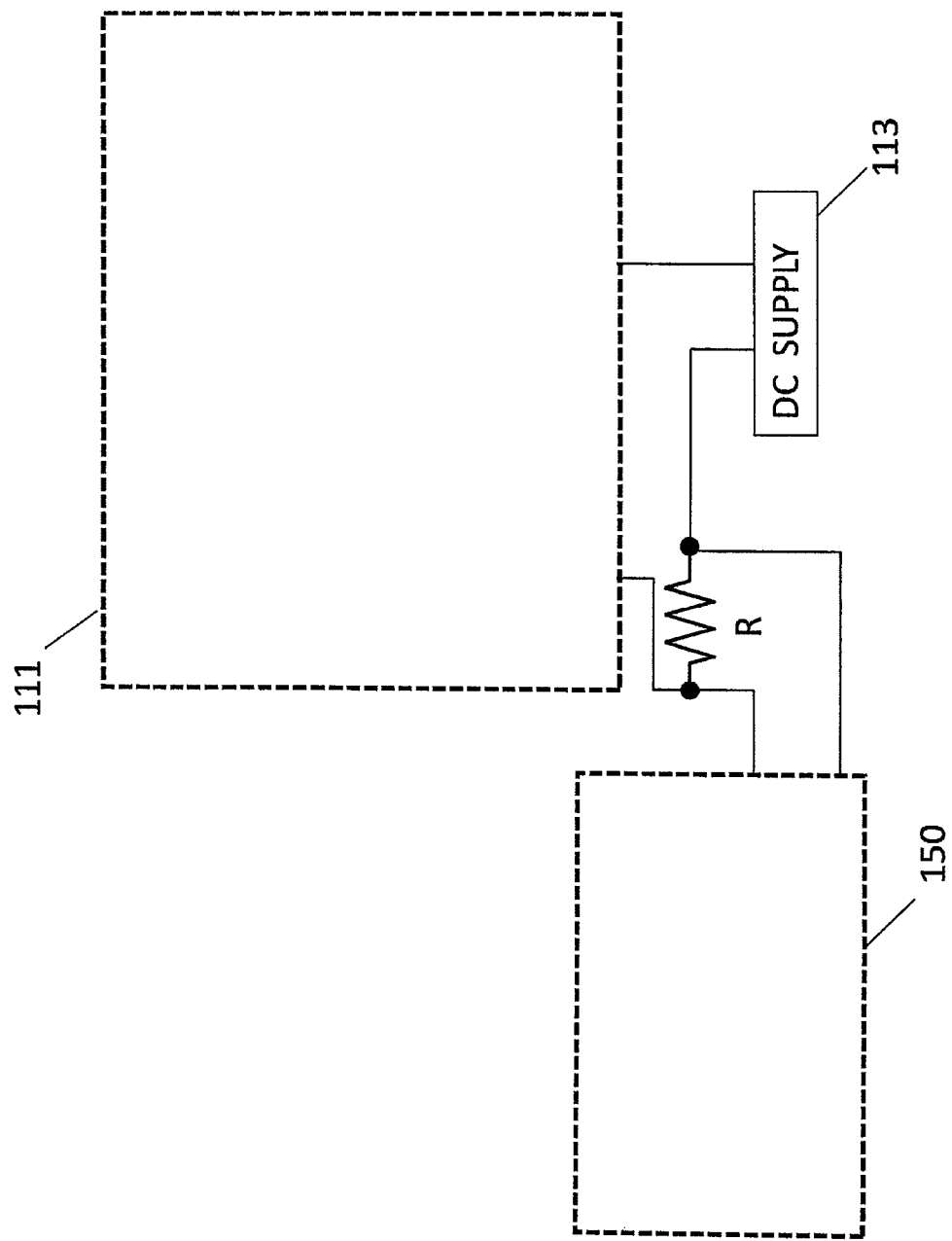
FIG. 3 illustrates the interconnections between a DC supply unit and two separate computerized environments, according to an embodiment of the invention.

FIG. 3 illustrates the interconnections between the DC supply unit 112 and the two separate environments 111 and 150. In principle the power consumption of the computerized environment 111 of the device can be analyzed by measuring the voltage and current of the device DC supply 113. In practice, the voltage of the DC supply is almost constant, so only the current provides significant data. Standard sampling equipment based on ADC (Analog to Digital Converter) can sample only voltage, so in order to measure the current a small series resistor R is connected to the DC supply output, ahead of the power socket, as shown in FIG. 3. In this arrangement, the sampled voltage is proportional to the current. There are two ways for the resistor R to be connected: to the positive electrode of the DC supply or to the negative (ground) electrode. If the resistor R is connected to the positive electrode, a differential amplifier for ADC (Analog to Digital Converter) is required. On the other hand if the resistor is connected to the negative electrode of the DC supply, a single end connection can do the work. The first connection is preferred due to its smaller amount of interferences. The sampling rate has to be at least two times larger than the maximum frequency of the sampled data (based on the Nyquist rate).

Example 1

Figure 4:
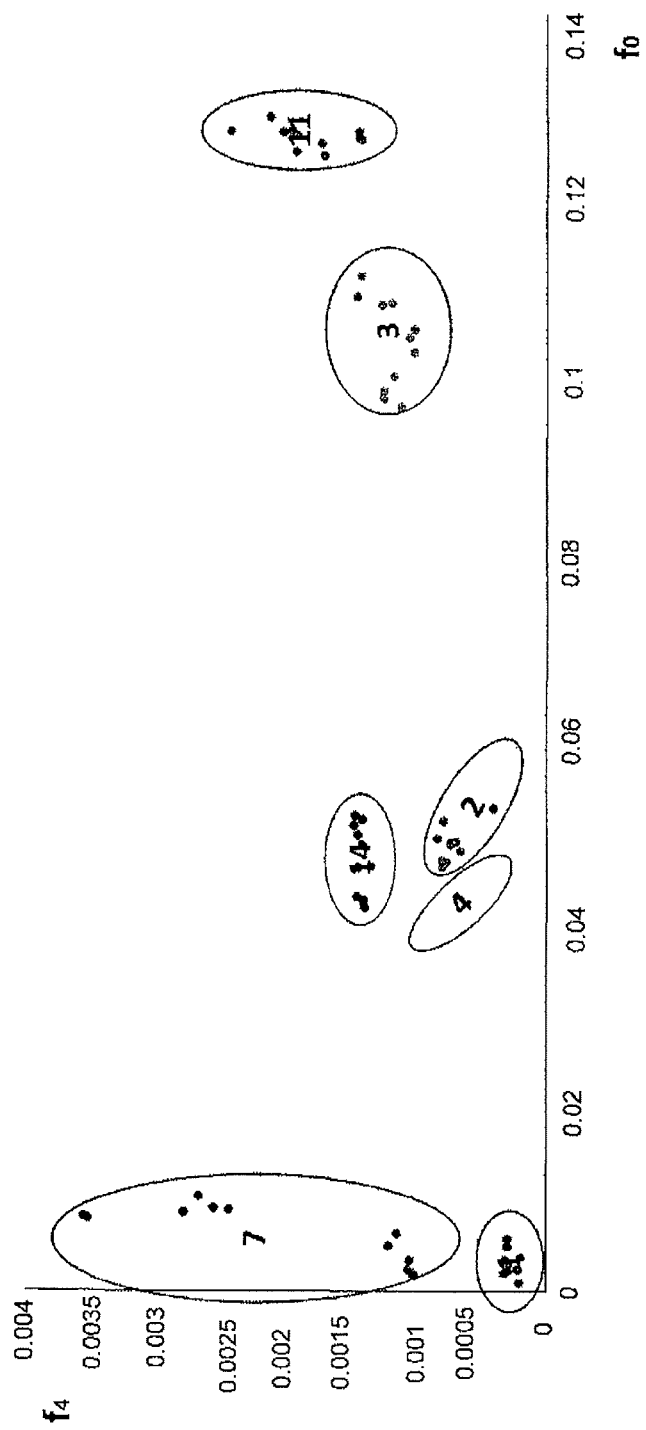
FIG. 4 is a graph showing the $f_4$ vs. $f_0$ of several events, as detected in an experiment, together with their associated indices.

A setup according to the present invention was arranged to check a mobile phone for various activities. The measurement setup was based on a National Instruments™ ADC USB card, with differential analog inputs, with voltage range of ±10 Volt, 1.25 MHz sample rate, and 16 bit ADC resolution. The card was connected to a PC through a USB connection, and data acquisition was performed using a Labview™ program. The sampled data was represented in the frequency domain as shown in FIG. 4. Most of the sampled signals were found to be pulses with a steep rise and a steep decline at the start and end of the pulse, respectively, and a nearly constant segment in between. The fast changes in the time domain were represented by high frequencies and the constant segment by low frequencies in the frequency domain. It has been found that the frequency domain provides better separation between signals relating to different activities. The transformation from time to frequency domain was performed using FFT (Fast Fourier Transform) which separated the sampled signals to plurality of discrete frequencies in the frequency domain. Each discrete frequency is referred herein as "feature". The number of the features by which the signals were examined varied depending on the sampling frequency and the time window selected. Different activities such as touch, Wi-Fi or GPS etc. were observed to have distinctive patterns over different sizes of time windows. The average window size for GPS and Wi-Fi was 4 seconds, and the window size for touch was between 100 to 300 mSec.

Various activities were separately recorded, and then concatenated. The various activities were represented by a single multi-valued label. The resulting dataset was visualized on 2 and 3 dimensions (i.e., frequencies), and revealed a pretty good separation between signals relating to the various activities. In addition, the dataset was classified, using J48 and LogitBoost (Machine Learning techniques well known in the art), and the resulting accuracy was found to be around 97%. Feature selection, using info-gain and gain-ratio, allowed a reduction of the number of features from 50 to 5, without a significant loss of accuracy. The following list provides index for the tested events:

| # | Tested activities |
|---|---|
| 1 | Screen OFF |
| 2 | Screen ON until shutdown |
| 3 | Touching the screen |
| 4 | GPS ON, screen OFF |
| 7 | WiFi ON |
| 11 | GPS ON, screen ON |
| 14 | GPS ON, WiFi ON |

FIG. 4 is a graph showing the $f_4$ vs. $f_0$ of several events, as detected in the experiment, together with their associated indices. The graph clearly shows that the events are distinguishable. As a result of this experiment, the distinguishing between these events in terms of power consumption enables forming of "events signatures", wherein each signature is a combination of the occurrence of one or more incidents (for example, the event no. 11 "GPS ON, Screen ON" comprises of two incidents). The results show a promising potential of the invention concept.

According to the present invention, the DC supply monitoring unit of the invention, which is totally separated and isolated from the computerized environment of the device, also comprises alert means. Upon detection of an event, an alert may be provided to the user, visually, audibly or both. The visual alert may be provided to the user, for example, by means of a light emitting diode, and the audible alert may be provided by means of a buzzer. In any case, all the means for providing said alerts are located on the printed circuit which is totally separated and isolated from the computerized environment of the device. Upon receipt of the alert, the user may decide how to relate to the alert, and whether to take an action.

Furthermore, the invention is applicable to detect various types of events, either malicious or not, and consequently the term "malicious", wherever used herein, should be viewed to relate to both of said cases.

As noted above, the computerized environment 150 of the present invention (which typically comprises a separate microprocessor and memory) is totally isolated from the computerized environment 111 of the monitored device. Preferably, the system of the invention is positioned on a separate printed board, which has no connection, either wire connection or wireless, with the computerized environment 111 of the device. The printed circuit of the invention, however, preferably has an input output port, for example, a USB, RS232, etc. port for inputting and outputting data between elements on the printed circuit and the "external world". This port may be used, for example, to update the malicious events signatures database 114 with new signatures.

In still another aspect, the invention may be used in conjunction with a prior art application for detecting malicious events, i.e., an application which detects such events by monitoring power consumption from the battery of power supply, and which runs within the computerized environment 111 of the device. According to this aspect of the invention, each of said environments creates its own log events, and saves it within its own environment (111 or 150), respectively. Once in a while, and offline (once in a week, once in a month, etc.), both of the saved logs may be downloaded and compared by means of a program which is external to both of said environments 111 and 150. If, for example, the comparison between the two events logs reveals many more events are detected by the external monitoring unit of the invention, but are missing from the internal prior art events log running within the computerized environment 111 of the device, this situation may hint that said monitoring program that runs within environment 111 has been maliciously manipulated to hide (or not to detect) malicious events.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A system for protecting a computerized device from a malicious activity resulting from a malicious code, comprising:
   a. a computerized environment of said computerized device having hardware and software which is accessible to a data network but which is devoid of any protecting software adapted to protect against an injected malicious code;
   b. a DC supply for powering the computerized environment of said computerized device;
   c. a separate computerized environment configured with circuitry which is totally separated and isolated from the computerized environment of said computerized device in terms of hardware physical separation and in terms of software separation and from any data network;
   d. a microprocessor-equipped first DC supply monitoring unit located within said separate computerized environment, wherein said first DC supply monitoring unit is connectable with said DC supply and is configured to monitor consumption of power derived from said DC supply;
   e. a memory device in which are stored one or more software-characteristic signatures of known software-related malicious events capable of being perpetrated on, and damaging, said computerized device, each of said signatures being a DC supply power consumption derived signature which is indicative of a different temporal effect relating to one of said known malicious events; and
   f. an application running on the microprocessor located within said separate computerized environment which is operable to compare monitored temporal characteristics of the power consumption derived from said DC supply with said stored one or more malicious event signatures and to generate an alert signal upon detection of a match.

2. The system according to claim 1, wherein the microprocessor is operable to monitor the power consumption by sampling current consumption from said DC supply.

3. The system according to claim 1, wherein said computerized device is a mobile device, and wherein said DC supply is a battery of the mobile device.

4. The system according to claim 1, wherein said computerized device is a stationary device, and wherein said DC supply is a power supply of the stationary device.

5. The system according to claim 1, wherein each of the stored signatures is indicative of a combination of the temporal effect relating to one of said known malicious events and of a temporal effect relating to one or more of individual incidents.

6. The system according to claim 1, further comprising alert means positioned within said separate computerized environment which are responsive to the generation of the alert signal and configured to output a predetermined sensed reaction, said alert means being visual alert means, audible alert means or a combination thereof.

7. The system according to claim 6, wherein said visual alert means is a light emitting diode, and said audible alert means is a buzzer.

8. The system according to claim 6, wherein the alert means is configured to output a sensed reaction that is characterized by several degrees of alerts.

9. The system according to claim 1, wherein the circuitry of the separate computerized environment is implemented as a printed circuit board, and wherein said printed circuit board has a port for communicating input and output data to and from the first DC supply monitoring unit.

10. The system according to claim 9, wherein said port is used to update the one or more signatures stored in said memory device.

11. The system according to claim 9, wherein said memory device is located within the separate computerized environment and also stores a first event log which is indicative of the monitored temporal characteristics of the power consumption derived from said DC supply, data associated with said first event log being outputtable via said port of said printed circuit board.

12. The system according to claim 11, which further comprises:
   a. a second DC supply monitoring unit located within the computerized environment of the device and which is connectable with said DC supply and configured to monitor consumption of power derived from said DC supply, wherein said second DC supply monitoring unit runs simultaneously with said first DC supply monitoring unit that runs within said separate environment, and is configured to generate a second event log which is indicative of the monitored temporal characteristics of the power consumption derived from said DC supply; and
   b. an external entity inaccessible to any data network which extracts said first event log from the separate computerized environment and said second event log from the computerized environment of the device, and which compares said first and second logs to detect a mismatch of detected malicious events which is reflective of malicious manipulation of said second DC supply monitoring unit.

13. The system according to claim 1, wherein the first DC supply monitoring unit is physically connectable with the DC supply.

14. The system according to claim 1, wherein the DC supply is external of, and feeds in parallel with DC voltage, the computerized environment of said computerized device and said separate computerized environment.

* * * * *